April 24, 1962  H. C. SCHMIDT  3,030,783
RIGHT-HAND WOUND, LEFT-HAND WOUND, COMPRESSION,
EXTENSION, TORSION SPRING
Filed April 14, 1961

INVENTOR
HENRY C. SCHMIDT

BY  *Scrivener & Parker*

ATTORNEYS

United States Patent Office 3,030,783
Patented Apr. 24, 1962

3,030,783
RIGHT - HAND WOUND, LEFT - HAND WOUND, COMPRESSION, EXTENSION, TORSION SPRING
Henry C. Schmidt, Bristol, Conn., assignor to Associated Spring Corporation, Bristol, Conn., a corporation of Delaware
Filed Apr. 14, 1961, Ser. No. 103,061
3 Claims. (Cl. 64—15)

This invention relates broadly to shaft couplings and spring devices and, more particularly, to the provision of a flexible shaft coupling of novel construction for connecting the rotating shafts of driving and driven members.

It has heretofore been proposed to provide a shaft coupling in the form of a coil spring, the ends of which are fastened to driving and driven shafts. When the driving member rotates in one direction such a spring coupling tends to wind or tighten in the direction of rotation and torque is transmtited in this direction. However, if the direction of rotation is reversed and the driven member becomes the driving member, the coil spring unwinds completely and no torque is transmitted, in many cases causing breaking of the coupling. Also if the normally aligned driving and driven shafts are laterally displaced with respect to each other excessive coil clash occurs in the usual spring coupling device.

The principal object of the present invention, therefore, has been to provide a spring shaft which will transmit torque from a driving to a driven shaft in either direction of rotation without affecting the efficiency of the drive. A further object of the invention has been to provide such a coupling which will permit continued rotation of both the driving and driven shafts in either direction notwithstanding any lateral misalignment or axial displacement thereof without, or with minimum, coil clash.

The invention is described in the following specification and illustrated in the accompanying drawing, in which FIG. 1 is a side elevational view showing the improved flexible coupling in operative position with respect to driving and driven shafts;

Figure 1:
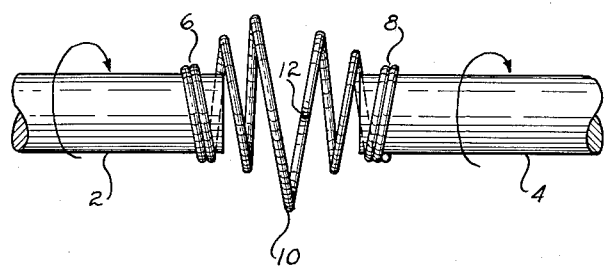
Figure 2:
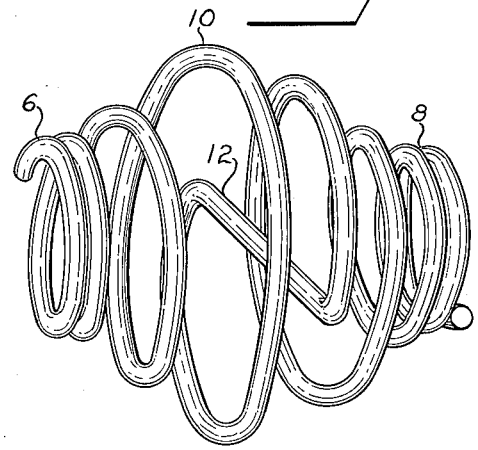
FIG. 2 is an enlarged perspective view of the coupling.

In FIG. 1 of the drawings there are shown a driving shaft 2 and a driven shaft 4 which, as shown, are axially aligned but which may become laterally or axially displaced with respect to each other. These shafts are connected by the spring coupling device provided by the present invention.

This device comprises a barrel shaped spring having end convolutions 6, 8 of smaller diameter and convolutions 10 of larger diameter at its center. There may be two or more small diameter convolutions at each end of the spring coupling and these are close wound with very small pitch and have constant diameter so that they will tightly fit over and onto the driving and driven shafts, respectively, and connect them through the intermediary of the body of the spring coupling device. From the one end 6 of the spring coupling the wire forming the coupling is wound with increasing diameter to the midpoint of the length of the spring, where the direction of winding is reversed and the wire is wound in a helix of opposite hand and decreasing diameter to the convolutions at the second end 8 of the spring. The two halves of the coupling device are integrally connected by a piece 12 of the wire which extends diametrically across the spring at the midpoint of the length thereof.

In the use of the coupling spring provided by the invention the end coils 6, 8 are attached to the shafts 2, 4 respectively, as by spreading these coils and inserting the shafts into them, after which the coils are released to tightly grip the shafts. In operation, torque will be transmitted from shaft to the other through the intermediary of the spring coupling, tending to wind up the coils of one half of the coupling and unwind those of the other half, regardless of which shaft is the driving shaft. If the shafts are vertically aligned the spring coupling permits a large amount of vertical displacement of the shafts with respect to each other without coil clash. Further, if the shafts become laterally displaced with respect to each other the spring coupling will yield to permit such displacement, while still transmitting driving torque, without coil clash, this being due to the "barrel" shape of the spring which permits considerably more lateral misalignment of the shafts before the coils of the coupling will clash. The reverse winding of the halves of the spring coupling permit torque transmission in either direction of rotation with sufficient rigidity to prevent unwinding.

Figure 3:
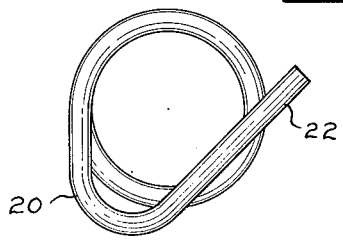
FIG. 3 is an end view of a modified form of the coupling spring provided by the invention.

A modified form of the invention is disclosed in FIG. 3 of the drawings and provides a new and improved means for attaching either or both ends of the coupling spring to a shaft having a flat surface. In this form of the invention the end convolution of the coupling spring, at either or both ends thereof, is formed with a return bend 20 providing a hairpin type part having a straight end 22, the inner surface of which forms a chord of the spring coil, as shown in the drawing. When the coupling spring is assembled to the shaft the inner surface of this straight part 22 rests on the flat of the shaft and transmits torque between the shaft and the coupling spring. It will be apparent that excess torque between the shaft and spring will cause the flat part 22 of the coupling spring to slip from the flat of the shaft whereby the excess torque will not be transmitted, thereby providing an overload release.

While I have described and illustrated two embodiments of the invention, it will be apparent to those skilled in the art to which the invention relates that other embodiments, as well as modifications of those disclosed, may be made and practised without departing from the spirit or scope of the invention, for the limits of which reference must be made to the appended claims.

What is claimed is:

1. A spring device for connecting rotating shafts comprising a length of wire wound in helical form in one direction from one end of the device throughout a part of the length thereof and in the opposite direction throughout the remainder of its length, the diameter of the device increasing from each end to the center thereof, said device having a part at each end constructed for attachment to a shaft.

2. A spring device for connecting rotating shafts comprising a length of wire having a part wound in helical form in one direction from one end of the device throughout a part of the length thereof and having another part wound in the opposite direction throughout the remainder of its length, the inner ends of said oppositely wound parts being connected by a straight part extending substantially diametrically of the spring, said device having a part at each end constructed for attachment to a shaft.

3. A flexible coupling for transmitting torque comprising a helical spring having annular end parts of substantially constant diameter and a body part, the diameter of the body part increasing toward the center of the spring from each end thereof, the convolutions of a portion of the spring being wound in a direction which is the reverse of the direction of winding of the remaining convolutions.

References Cited in the file of this patent

UNITED STATES PATENTS

| | | |
|---|---|---|
| 1,150,483 | Barber | Aug. 17, 1915 |
| 1,987,316 | Zimmer | Jan. 8, 1935 |
| 2,047,329 | Petersen | July 14, 1936 |
| 2,254,566 | Cornell | Sept. 2, 1941 |